US011958477B2

(12) United States Patent
Hoedt et al.

(10) Patent No.: US 11,958,477 B2
(45) Date of Patent: Apr. 16, 2024

(54) DRIVER ASSISTANCE SYSTEM FOR AN AT LEAST PARTIALLY AUTOMATICALLY DRIVING MOTOR VEHICLE, MOTOR VEHICLE AND METHOD FOR CONTROLLING A VEHICLE DYNAMICS

(71) Applicants: Volkswagen Aktiengesellschaft, Wolfsburg (DE); AUDI AG, Ingolstadt (DE)

(72) Inventors: Jens Hoedt, Hannover (DE); Ulrich Hofmann, Abenberg (DE)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 428 days.

(21) Appl. No.: 16/761,291

(22) PCT Filed: Oct. 31, 2018

(86) PCT No.: PCT/EP2018/079830
§ 371 (c)(1),
(2) Date: May 4, 2020

(87) PCT Pub. No.: WO2019/086518
PCT Pub. Date: May 9, 2019

(65) Prior Publication Data
US 2021/0188256 A1 Jun. 24, 2021

(30) Foreign Application Priority Data

Nov. 3, 2017 (DE) ...................... 10 2017 125 729.2

(51) Int. Cl.
*B60W 30/08* (2012.01)

(52) U.S. Cl.
CPC ......... *B60W 30/08* (2013.01); *B60W 2554/00* (2020.02)

(58) Field of Classification Search
CPC ............ B60W 30/08; B60W 2554/00; B60W 2050/0088; B60W 2555/00; B60W 30/10;
(Continued)

(56) References Cited

U.S. PATENT DOCUMENTS 9,081,387 B2    7/2015    Bretzigheimer et al.
9,108,600 B2    8/2015    Hartmann et al.
(Continued)

FOREIGN PATENT DOCUMENTS

CN    105473408 A       4/2016    ............. B60K 28/06
DE    102010028384 A1   11/2010   ............. B60T 8/1755
(Continued)

OTHER PUBLICATIONS

International Search Report and Written Opinion, Application No. PCT/EP2019/079830, 24 pages, dated Feb. 27, 2019.
(Continued)

*Primary Examiner* — Maceeh Anwari
(74) *Attorney, Agent, or Firm* — Slayden Grubert Beard PLLC

(57) ABSTRACT

The invention relates to a driver assistance system (11) for an at least partially automatically driving motor vehicle (10), wherein the driver assistance system (11) comprises at least one environment detection means (13) which is designed to detect at least one area of an environment (U) of the motor vehicle (10), an evaluation device (14) which is designed to determine a target trajectory (T) to be traveled by the motor vehicle (10) according to the detected at least one area of the environment (U), and a control device (18) which is designed to adjust the target trajectory (T) determined by the evaluation device (14). According to the invention, the
(Continued)

evaluation device (14) is designed to determine at least one free area value (W) according to the detected at least one area of the environment (U), and to transfer same to the control device (18), wherein the control device (18) has at least one adjustable control parameter (R1, R2, Rn), and the control device (18) is designed to adjust the at least one control parameter (R1, R2, Rn) according to the transferred free area value (W), and to adjust the target trajectory (T) according to the adjusted at least one control parameter (R1, R2, Rn).

16 Claims, 2 Drawing Sheets

(58) Field of Classification Search
CPC .... B60W 30/095; B60W 40/04; B60W 50/00; B60W 50/0097; B60W 60/001; G06V 20/58; G08G 1/166; G05D 1/0212
See application file for complete search history.

(56) References Cited

U.S. PATENT DOCUMENTS

| | | | |
|---|---|---|---|
| 9,873,427 | B2 | 1/2018 | Danzl et al. |
| 10,532,770 | B2 | 1/2020 | Khlifi et al. |

| | | | | |
|---|---|---|---|---|
| 2014/0067206 | A1* | 3/2014 | Pflug | ............... B62D 15/0265 |
| | | | | 701/41 |
| 2017/0120902 | A1* | 5/2017 | Kentley | ................ B60R 19/42 |
| 2017/0253241 | A1 | 9/2017 | Filev et al. | |
| 2019/0079527 | A1* | 3/2019 | Censi | ................... G05D 1/0221 |

FOREIGN PATENT DOCUMENTS

| | | | | |
|---|---|---|---|---|
| DE | 102010055373 A1 | 6/2012 | ............ | B60W 30/14 |
| DE | 102012203187 A1 | 9/2012 | ............ | B60W 30/08 |
| DE | 102013016422 A1 | 4/2015 | ............ | B60W 30/08 |
| DE | 102014114827 A1 * | 4/2015 | ......... | B60R 21/0134 |
| DE | 102015209217 B3 | 9/2016 | ............ | B60W 30/08 |
| DE | 102016205152 A1 | 10/2017 | ............ | B60W 30/08 |
| WO | 2017/157787 A1 | 9/2017 | ............ | B62D 15/02 |
| WO | 2019/086518 A1 | 5/2019 | ......... | B60W 30/095 |

OTHER PUBLICATIONS

Korean Office Action, Application No. 2021073214309, 3 pages, dated Sep. 14, 2021.
Korean Office Action, Application No. 1020207015706, 16 pages, dated Mar. 16, 2021.
Chinese Office Action, Application No. 201880070374.7, 22 pages, dated Sep. 2, 2022.

* cited by examiner

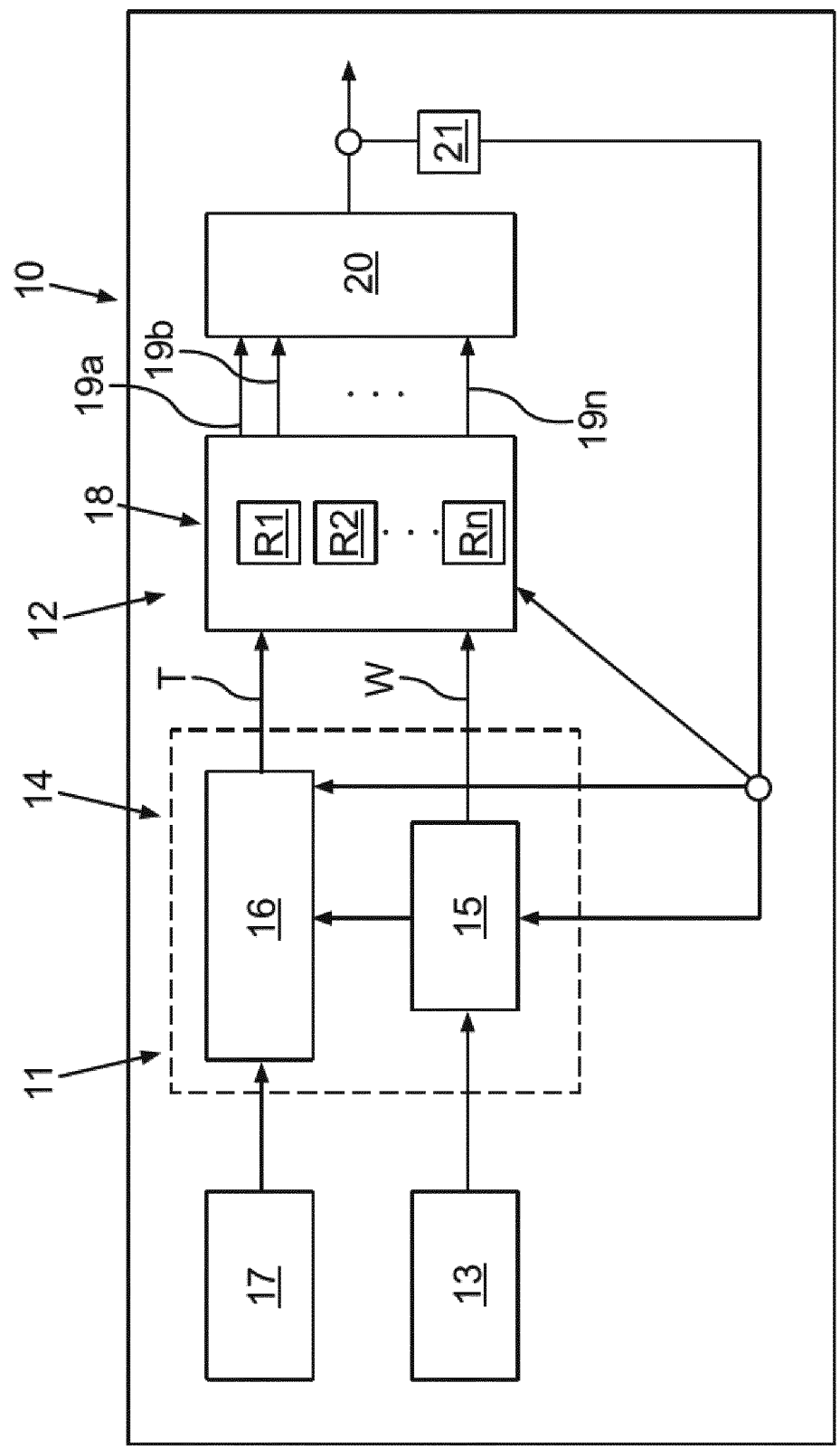

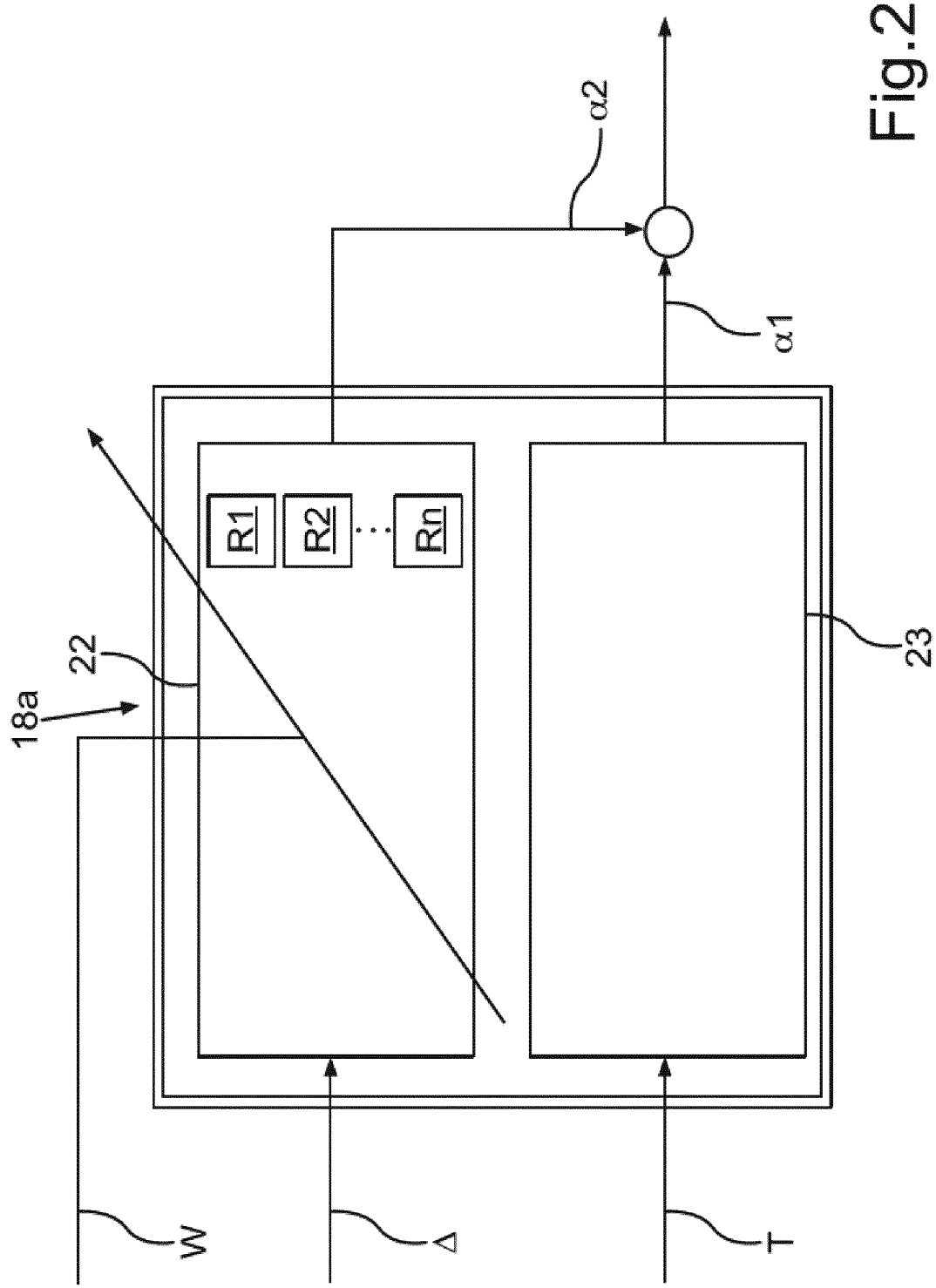

DRIVER ASSISTANCE SYSTEM FOR AN AT LEAST PARTIALLY AUTOMATICALLY DRIVING MOTOR VEHICLE, MOTOR VEHICLE AND METHOD FOR CONTROLLING A VEHICLE DYNAMICS

CROSS-REFERENCE TO RELATED APPLICATIONS

This application claims priority to German Patent Application No. DE 10 2017 125 729.2, filed on Nov. 3, 2017 with the German Patent and Trademark Office. The contents of the aforesaid Patent Application are incorporated herein for all purposes.

TECHNICAL FIELD

The invention relates to a driver assistance system for an at least partially automatically driving motor vehicle, wherein the driver assistance system comprises at least one environment detection device, which is configured to detect at least one area of an environment of the motor vehicle, an evaluation device, which is configured to determine a target trajectory to be traveled by the motor vehicle depending on the detected at least one area of the environment, and a drive dynamics control system with a control device, which is configured to adjust the target trajectory determined by the evaluation device. A motor vehicle with such a driver assistance system and a method for controlling drive dynamics of a motor vehicle also relates to the invention.

BACKGROUND

DE 10 2012 203 187 A1 describes a method and a device for detecting and adapting movement trajectories of motor vehicles. In particular, this method deals with ascertaining an optimum evasive trajectory if a collision course with high risk of collision is determined. Hereto, an intersecting set of the possible evasive trajectories with the physically possible movement trajectories is formed, which result from the drive-dynamic characteristics of the motor vehicle and the friction value appearing between tire and roadway up to a maximally possible limit friction value. The trajectory to be traveled is then selected from this intersecting set. Corresponding to this selected movement trajectory, braking or steering interventions with the aim of driver assistance or the correction of driver presettings can then be performed or also fully automated braking and steering interventions.

However, motor vehicles are also known from the prior art, in which automatic guidance can also be effected independently of the presence of a possible collision situation, such as for example motor vehicles, which are enabled to highly automated or also autonomous driving, or also motor vehicles, which can at least temporarily execute automatically driving in certain situations, such as for example on highways or in automatically parking, or the like. In such cases too, a target trajectory, which is to be traveled by the motor vehicle, is usually determined based on the environment of the motor vehicle detected by environmental sensors. For this purpose, the target trajectory determined by a path planning device is transferred to a controller, which adjusts the target trajectory. Thus, within the scope of automatically driving, a drive dynamics control has the task to adjust a trajectory, which is provided by the path planning. The planned path in turn depends on data, which is provided in the form of an environmental perception or of an environmental model.

Furthermore, such a drive dynamics control usually comprises a fixed parameter set, which has substantial effects on how dynamically the trajectory provided by the path planning is adjusted. If these parameters of the parameter set are set very hard in the system-dynamic sense, the trajectory is very accurately adjusted and severe vehicle reactions follow even with small deviations from the target trajectory, which are expressed in high yaw rates and lateral accelerations. However, these severe reactions adversely affect the driving comfort. On the other hand, in a soft design of the parameters, the effects on deviations from the target trajectory are lower and thereby the comfort is considerably higher. Disadvantageously, however, the accuracy with respect to the target trajectory to be adjusted then becomes considerably lower by this soft setting of the control parameters. In other words, it is not ensured that the vehicle indeed travels on the planned target trajectory in this case, and more or less severe deviations from this target trajectory can occur, which in turn can result in very safety-critical situations and possible collisions. Since safety-critical situations are of course to be avoided in all circumstances, the parameters are usually designed rather hard, but which is again at the expense of the comfort.

SUMMARY

An object of the present invention is to provide a driver assistance system, a motor vehicle and a method for controlling drive dynamics of an at least partially automatically driving motor vehicle, which allow better harmonizing the discrepancy between safety and comfort in adjusting a given target trajectory.

The object is solved by a driver assistance system, a motor vehicle and a method for controlling drive dynamics with the features according to the respective independent claims. Embodiments of the invention are the subject matter of the dependent claims, of the following description, as well as of the FIGS.

Within the scope of the present invention, not only a system for assisting a driver is to be understood by a driver assistance system, but systems may also be understood thereby, which are formed for completely autonomous driving, in particular without the necessity of a driver taking over himself driving tasks.

BRIEF DESCRIPTION OF THE DRAWINGS

IN THE FIGS.:

FIG. 1 shows a schematic representation of a motor vehicle with a driver assistance system according to an embodiment; and FIG. 2 shows a schematic representation of a lateral controller of a driver assistance system according to an embodiment.

DETAILED DESCRIPTION

A driver assistance system according to a first exemplary aspect of the invention for an at least partially automatically driving motor vehicle comprises at least one environment detection device, which is configured to detect at least one area of an environment of the motor vehicle, an evaluation device, which is configured to determine a target trajectory to be traveled by the motor vehicle depending on the detected at least one area of the environment, and a drive dynamics control system with a control device, which is configured to adjust the target trajectory determined by the evaluation device. Furthermore, the evaluation device is configured to determine at least one free area value depending on the detected at least one area of the environment and to transfer it to the control device, wherein the control device is configured to adjust at least one parameter influencing the control depending on the transferred free area value and to adjust the target trajectory according to the adjusted at least one parameter influencing the control.

The present aspect is based on the realization that the problem of discrepancy between safety and comfort results from the fact that the path planning determines a target trajectory depending on the detected environment, which is then adjusted by the controller, whereby a direct communication between the controller and the environment perception disadvantageously cannot be effected. Correspondingly, the controller either cannot assess, in which situation the transferred target trajectory has to be adjusted as accurately as possible and in which situations larger deviations from this target trajectory would also be acceptable in favor of the comfort. Now, this realization may be beneficially used to encode this information in a corresponding free area value, which may then be transferred to the controller, which thus beneficially may adapt the control strategy corresponding to the transferred free area value. This free area value transferred to the control device, the ascertainment of which is explained in more detail later, may thus for example reflect the size of the free drive environment, i.e., the environmental area of the motor vehicle, which may be freely traveled without risk of collision or risk of accident. Thus, the control device may beneficially adjust the parameter influencing the control, for example the control parameters of the controller, in a critical situation represented by the free area value, such that the target trajectory is adjusted as accurately as possible, i.e., thus very hard in the system-dynamic sense, while the controller for example may adjust the control parameters in an uncritical situation represented by the free area value such that the target trajectory is adjusted in very comfortable manner, thus, this means that the control parameters are adjusted very soft in the system-dynamic sense. Correspondingly, a tradeoff between safety and comfort does no longer have to be made, because by the transferred free area value, the control device is now capable of considering the current environmental situation, which may be represented by the free area value, in adjusting the target trajectory and thereby of always configuring the adjustment of this target trajectory as comfortable as possible without therein having to take any safety risks.

In some embodiments, the at least one environment detection device may be formed as any environmental sensor. In some embodiments, the driver assistance system may also comprise multiple environment detection devices. For example, such environment detection devices may for example represent cameras, laser scanners, radar sensors, ultrasonic sensors, or the like. In addition, they may be configured to detect only a partial area of the environment around the motor vehicle, such as for example the front area, or also completely cover the environment around the motor vehicle and thereby have an overall detection area, which covers the environment of the motor vehicle in a full angle, i.e. 360°, around the motor vehicle.

Furthermore, the evaluation device may comprise various modules for performing individual tasks. For example, it may comprise an environmental modeling module, which ascertains the at least one free area value depending on the environmental data detected by the sensors. Furthermore, the environmental modeling module may additionally create an environmental model also depending on the environmental data detected by the sensors, which may be used for ascertaining the free area value or other quantities. For example, the environmental model may also be communicated to a path planning device, which may represent a further module of the evaluation device, which ascertains the target trajectory based thereon.

In this case, a trajectory is defined as a path curve, which describes the spatial position of the motor vehicle or of a point of the motor vehicle depending on the time. For ascertaining the target trajectory, the evaluation device may comprise a corresponding path planning device. The target trajectory determined based on the detected environment by the evaluation device or the path planning device thereof may be determined according to methods known from the prior art. The determination of the target trajectory may for example be determined depending on a preset navigation destination, the course of the road, a maximally permissible maximum speed, as well as based on the environment detection, i.e., depending on the lane course detected by the environment detection, obstacles, other traffic participants or the like. Furthermore, the target trajectory may, e.g., be determined such that the motor vehicle always remains in the drive-dynamically stable range in traveling this trajectory. The adjustment of the target trajectory by the control device may also for example always effected such that the motor vehicle therein always remains in the drive-dynamically stable range.

In some embodiments, the control device comprises at least one adjustable control parameter, and the control device is configured to adjust the at least one adjustable control parameter as the at least one parameter influencing the control. This configuration is particularly beneficial since especially the control parameters and the initially mentioned parameter set of a controller, respectively, influence the control strategy and the manner of the control and in particular determine how severely and how fast, respectively, deviations are adjusted. Correspondingly, it may be determined by the adjustment of the control parameters if deviations are to be corrected as fast as possible and the target trajectory is to be adjusted as accurately as possible or if a slower correction of deviations is also admissible in favor of the comfort on the other hand. Since this is again effected depending on the transferred at least one free area value, a particularly good adaptation to situation is hereby provided.

Alternatively or additionally and in some embodiments, the at least one parameter influencing the control may also represent a scaling parameter for scaling a control deviation. Consequently, scaling of the control error, i.e., of the control deviation, depending on the at least one free area value is also possible. Hereby too, the above mentioned benefits may be achieved. This is substantiated in that a large control deviation, for example a large deviation of the actual trajectory from the target trajectory to be adjusted, entails more severe control interventions with given control parameters than smaller control deviations. Correspondingly, scaling of the control deviation such that the control deviation decreases, for example entails that also the control interventions of the controller based on the control deviation turn out to be lower and are thereby more comfortable than without scaling. Thus, if a target trajectory is for example to be adjusted as accurately as possible, as it may again be communicated to the controller by the at least one free area value, thus, the control parameters may be adjusted very hard and/or the control deviation remains unscaled. If a very comfortable control, for example caused by a free environment, is possible on the other hand, thus, the control parameters may be adjusted very soft and/or the control deviation is scaled by the scaling parameter such that it decreases.

In some embodiments, the at least one parameter influencing the control determines the manner how the target trajectory is adjusted. If this parameter represents a control parameter, the control device, e.g., does not only have one, but multiple, up to numerous control parameters. This allows a particularly good and flexible adaptation to the situation.

In some embodiments, the at least one control parameter or generally the at least one parameter influencing the control may in particular determine how fast a deviation of an actual trajectory of the motor vehicle from the target trajectory is corrected. Thus, if the control parameters are adjusted such that deviations from the target trajectory are very fast corrected, thus, this results, at least on time average, in considerably higher yaw rate and lateral accelerations than in adjustment of the control parameters such that deviations from the target trajectory are slower corrected. Thus, by adjusting the control parameters, it may correspondingly be determined if a very fast correction of deviations from the target trajectory is to be effected, which is beneficial in critical environmental situations, since the target trajectory is then very accurately complied with, or a slower correction may be effected in favor of the comfort, which is beneficial in uncritical environmental situations.

In some embodiments, the control device is configured to ascertain a manipulated value for a manipulated variable to be adjusted on at least one actuator depending on the target trajectory and depending on the transferred free area value and to control the at least one actuator for adjusting the manipulated value. Thus, in controlling actuators for adjusting the target trajectory, not only the transferred target trajectory is beneficially considered, but especially also the free area value, which thus virtually indicates how accurately or how fast the target trajectory has to be adjusted. Of course, further parameters may also be considered in controlling the at least one actuator and in determining the manipulated variable to be adjusted, respectively, as well as of course also the current deviation between the actual trajectory of the motor vehicle and the target trajectory.

Therein, these individual steps, that is the determination of the target trajectory based on the environment detection, the ascertainment of the free area value and the adjustment of the target trajectory depending on the transferred free area value, are performed continuously repeated, e.g., periodically. In other words, thus, the calculation of the target trajectory as well as of the free space value are repeatedly performed and updated in respective, consecutive time steps as well as also correspondingly the adjustment of the target trajectory and the calculation of the manipulated values to be adjusted associated therewith depending on the transferred free area value.

In other embodiments, the evaluation device is configured to determine the at least one free area value as a current first free area value depending on the detected at least one area of the environment and to transfer it to the control device as well as to predict at least one future second free area value depending on the detected at least one area of the environment and to transfer it to the control device, wherein the control device is configured to adjust the at least one parameter influencing the control depending on the transferred first and second free area values. Thus, in adjusting the target trajectory, not only the environmental situation represented by the current free area value may be considered in a current driving situation, but also an environmental situation represented by the future free area value in a future driving situation. Thereby, abrupt changes in the control strategy in adjusting the target trajectory may be avoided, in particular in case that the environmental situation abruptly changes. For example, the environment may be relatively freely travelable in a current driving situation since further traffic participants are not in closer vicinity of the motor vehicle, but based on the current environment detection by the environmental sensors, which occasionally may also detect areas of the environment of the motor vehicle very far ahead, it may already be predictable that many other traffic participants or a construction site or the like are on the further driving route, such that the current environmental situation thus will presumably change in the future. Correspondingly, the transition between the very comfortable adjustment of the target trajectory in the current situation to a future control, which aims to a very strict compliance with the target trajectory, may also be configured in continuous, harmonic manner and thus also in very comfortable manner. Thereby, the comfort may be additionally increased.

Although reference is made below to current driving situations as well as current free area values, thus, these explanations very analogously apply to the described future free area value, which is calculated in the same manner, only with respect to an environmental area farther away, and optionally may be used for adjusting the control parameters and the at least one parameter influencing the control, respectively.

In some embodiments, the evaluation device is configured to evaluate an, e.g., current or future, driving situation depending on the detected at least one area of the environment according to at least one criterion with respect to its criticality in case of a deviation of the trajectory traveled by the motor vehicle from the target trajectory and to determine the at least one free area value depending on the evaluation. Thus, the control device beneficially obtains information about the current and optionally also the future criticality of the driving situation with respect to the vehicle environment by the transferred free area value.

In order to now represent the environmental situation and the criticality thereof by the free area value, there are multiple possibilities, from a binary solution up to a continuous assessment of the free area value, as it is now explained in more detail.

In some embodiments, the evaluation device is configured to evaluate the driving situation as critical or as uncritical and to determine the free area value from only two predetermined values different from each other depending on the evaluation, such that the free area value assumes a first value of the two values in a driving situation evaluated as uncritical, and the free area value assumes a second one of the two values in a driving situation evaluated as critical. These values may be arbitrarily chosen since their numerical quantity does not have any significance per se, they only serve for communicating to the control device, which one of the two driving situations, critical or uncritical, is currently and optionally also in the future present. These two values may for example represent 0 and 1. If the current driving situation is evaluated as uncritical, thus, "0" may for example be communicated to the control device as the free area value, and if the current driving situation is assessed as critical, thus, "1" may be correspondingly communicated to the control device as the free area value. Correspondingly, two corresponding adjustments for the at least one parameter influencing the control may then also be preset, such that a first adjustment is selected for the critical case and the other adjustment is selected for the uncritical case. This represents a particularly simple embodiment.

In some embodiments, the evaluation device is configured to determine the free area value as one of numerous different values from a predetermined interval of values with a first and a second interval boundary, wherein the evaluation device is configured to set the free area value such that the free area value is selected the closer to the first interval boundary, the more uncritical the driving situation has been evaluated according to the at least one criterion. Herein, a closed interval with quasi continuously consecutive values may for example be preset, from which the free area value may be selected. Hereby, arbitrarily fine graduations for the representation of the criticality by the free area value may be realized. For example, the preset interval may be set from 0 to 1. The free area value may then for example assume the values 0.0 or 0.1 or 0.2 etc. to 1.0 or else 0.00 or 0.01 or 0.02 etc. to 1.00. Analogously, the free area value may also have three, four, etc. decimal places. The graduations or adjusting possibilities for the parameters influencing the control may also be correspondingly fine and differentiated. Therein, the possibility of quasi continuously selecting the free area value in a predetermined interval depending on the environmental situation is particularly beneficial since a particularly smooth and continuous adaptation of the control may be provided by a continuous value.

In some embodiments, the evaluation device is configured to ascertain the criticality depending on at least one of the following environmental parameters, which is ascertained based on the detected at least one area of the environment: a presence of at least one predetermined object in an environment of the motor vehicle and/or a distance to the at least one predetermined object in the environment of the motor vehicle and/or a number of predetermined objects present in the environment of the motor vehicle and/or a type of an object detected in the environment of the motor vehicle.

For example, it may be detected if a predetermined object is present in an environment of the motor vehicle. Hereto, it may for example be examined based on the environment detection if other traffic participants like other motor vehicles are located in the environment of the motor vehicle or not. If this is not the case, the situation may be evaluated as more uncritical than in case that one or more other traffic participants are located in the environment of the motor vehicle. The distance of these predetermined objects to the motor vehicle or to the planned trajectory may also represent a further criterion for evaluating the criticality. Thus, the more distant recognized objects for example are, the more uncritical the situation is evaluated. Such objects may for example again be other traffic participants or also roadway boundaries and/or lane markings. The number of predetermined objects present in the environment of the motor vehicle may also be incorporated in the evaluation of the criticality. The more other objects, in particular other traffic participants, are located in the environment of the motor vehicle, the more critical the situation may be evaluated.

In the evaluation of the criticality of a driving situation, the type of a detected object may also be taken into account since more or less risk is posed by some objects or more or less caution is advised for some objects. For example, with pedestrians present in the environment of the motor vehicle, a particularly high degree of caution is advised, wherefore the driving situation may be evaluated as more critical in such a case than with non-relevant objects like for example a plastic bag on the lane. The criticality may be evaluated also depending on numerous further environmental parameters. Further parameters not based on an environment detection may also be incorporated in the evaluation of the criticality, such as for example the motor vehicle speed.

In some embodiments, multiple or all of the above mentioned parameters may also be used as the at least one criterion, according to which the criticality of the driving situation is assessed, depending on which the free area value is in turn determined. For example, the overall criticality of the current situation may be effected as a weighted sum of the evaluation according to multiple or all of the above mentioned individual criteria. For ascertaining a future free area value, the criticality for a future driving situation may be very analogously ascertained, in particular depending on the above mentioned parameters, but then correspondingly with respect to an environmental area farther away from the motor vehicle, for example with respect to the current direction of travel or with respect to the currently planned target trajectory.

A further exemplary aspect relates to a motor vehicle with a driver assistance system according to the preceding aspect or one of its embodiments. Thereby, the benefits mentioned for the driver assistance system according to the preceding aspect and its embodiments apply to the motor vehicle according to the present aspect in the same manner.

A further exemplary aspect relates to a method for controlling drive dynamics of an at least partially automatically driving motor vehicle, wherein at least one area of an environment of the motor vehicle is detected, a target trajectory to be traveled by the motor vehicle is determined depending on the detected at least one area of the environment and the determined target trajectory is adjusted by a control device. Therein, at least one free area value is determined depending on the detected at least one area of the environment and transferred to the control device, wherein at least one parameter of the control device influencing the control is further adjusted depending on the transferred free area value and the control device adjusts the target trajectory according to the adjusted at least one parameter influencing the control.

Embodiments of the method of the present aspect, which comprise features as they have already been described in context of the embodiments of the driver assistance system according to the first aspect, also belong to the present aspect. For this reason, the corresponding embodiments of the method are not again described here.

In the following, another embodiment is described.

The embodiment explained in the following is another embodiment of the invention. In the embodiment, the described components of the embodiment each represent individual features of the invention to be regarded independently of each other, which each develop the invention also independently of each other and thereby are also to be regarded as a constituent of the invention individually or in another than the shown combination. Furthermore, the described embodiment may also be supplemented by further ones of the already described features.

In the FIGS., functionally identical elements are respectively provided with the same reference numerals.

FIG. 1 shows a schematic representation of an at least partially automatically driving motor vehicle 10 with a driver assistance system 11 with a drive dynamics control system 12 according to an embodiment of the invention. Therein, the driver assistance system 11 comprises an environment detection device, in particular environmental sensors 13, such as for example cameras, laser scanners, radar sensors, ultrasonic sensors or the like. They are configured to at least partially detect the environment U of the motor vehicle 10 and to supply the detected environmental data to an evaluation device 14, in particular an environmental modeling system or environmental module 15 of the evaluation device 14. Based on this environmental data, an environmental model is created by the environmental module 15. Such an environmental model may for example contain the information about where in the environment of the motor vehicle 10 other objects, such as for example further traffic participants, peripheral developments, lane markings or the like, are arranged and which areas may be correspondingly freely traveled by the motor vehicle 10. This environmental information is then correspondingly supplied from the environmental module 15 to a path planning device 16 of the evaluation device 14. The path planning device 16 then correspondingly calculates a target trajectory T, which is transferred to a control device 18 of the drive dynamics control system 12, based on the communicated environmental data as well as additionally based on map data of a map 17 for example provided by a navigation system of the motor vehicle 10. This control device 18 then calculates corresponding manipulated variables 19a, 19b, 19n for various actuators 20 of the motor vehicle 10 depending on the communicated target trajectory T, such as for example a steering angle, a braking or accelerating guideline, or the like. A steering of the motor vehicle 10 as well as a braking and accelerating device then correspondingly belong to the actuators 20. For adjusting the target trajectory T, however, diverse further actuators 20 may also be controlled, such as for example a front axle or rear axle differential, a roll compensating device or the like.

Furthermore, movement parameters 21 of the motor vehicle are also continuously detected, such as for example the current position of the motor vehicle 10, the current speed, the current acceleration, higher derivatives of the current acceleration, in particular also in radial direction, such as for example a radial acceleration, rotations etc. These detected movement parameters 21 may in turn be supplied to the control device 18 as well as optionally also to the environmental module 15 and/or the path planning device 16. The current deviation of the actual trajectory of the motor vehicle 10 from the target trajectory T may in turn be calculated from these detected movement parameters 21 of the motor vehicle 10 and corresponding corrections may be performed by the control device 18.

Furthermore, the control device 18 includes multiple control parameters R1, R2, Rn, which have a substantial effect on how dynamically the target trajectory T provided by the path planning device 16 is adjusted. If these control parameters R1, R2, Rn are adjusted very hard in system-dynamic sense, the target trajectory T is very accurately adjusted and severe vehicle reactions, which are expressed in high yaw rates and lateral accelerations, are effected even upon small deviations from the target trajectory T. In contrast, if these control parameters R1, R2, Rn are adjusted very soft, the effects upon deviations from the target trajectory T are lower and the comfort increases.

However, in usual drive dynamics control systems, there is the problem that the control parameters R1 are fixed and the control device does not communicate with the environment perception and thereby may only consider the trajectory provided by the path planning. In order to avoid safety-critical situations, which may arise from deviations of the actual trajectory from the preset target trajectory, the control parameters are usually selected very hard, but which severely decreases the driving comfort.

However, if the drive dynamics controller 18, as it is provided according to this embodiment, now gets directly information from the environmental model or from the environmental module 15 about the character of the current environmental situation, the control parameters R1, R2, Rn may be beneficially adapted according to situation. This may be described via a corresponding free area value W as follows, which describes the accuracy for adjusting the trajectory T requested by the environment perception or by the environmental module 15.

If the motor vehicle 10 is in an uncritical situation, which is for example described in that the motor vehicle 10 is far away from roadway boundaries and further objects are not in the vicinity of the planned trajectory T, this may be communicated from the environmental module 15 to the control device 18 by a, for example low, free area value W and the control parameters R1, R2, Rn may be correspondingly selected by the control device 18 such that the reactions to a deviation from the trajectory T turn out to be lower in favor of the comfort.

If the motor vehicle 10 is in the vicinity of a roadway edge or if objects are in immediate vicinity, the environmental module 15 correspondingly communicates it to the control device 18 via a, for example higher, free area value W and the control parameters R1, R2, Rn are selected correspondingly to this free area value W such that the trajectory T is safely and accurately adjusted.

Thus, an information exchange between the environmental module 15 and the drive dynamics control device 18 may be provided in particularly beneficial and simple manner and associated therewith a possibility of adaptation of the parameter set of the control device 18 according to situation.

Therein, the control device 18 for example obtains a continuous value as the free area value W in fixed limits from the environmental module 15, wherefrom the control device 18 may finally infer if a critical situation is present or the environment of the motor vehicle 10 is free and all of the transitions in between.

With a drive dynamics controller 18, which for example operates based on error dynamics, which describes the movement of the motor vehicle in the error space based on model, in particular by differential equations describing the movement, the eigenvalues of which finally effectively describe how fast errors are corrected, the eigenvalues of the error dynamics usually used for designing may be adapted corresponding to the communicated free area value W. In critical situations, a strongly negative eigenvalue configuration may for example be selected, which may fully exploit the limits of the actuator technology. In uncritical situations, the eigenvalues are shifted towards zero.

Alternatively to a continuous free area value W, it may also assume only two different values, one for critical situations and one for uncritical situations. This represents a particularly simple variant, while a continuous free area value W allows smooth and continuous adaptation of the control device 18.

However, in the same manner, there is not only the possibility of adapting the control parameters R1, R2, Rn, but alternatively or additionally also the possibility of scaling the control error or the control deviation.

FIG. 2 shows a schematic representation of a part of the control device 18 from FIG. 1, in particular a lateral controller 18a, which is responsible for controlling a steering angle α as the manipulated variable 19a, 19b, 19n. This lateral controller 18a may in turn include two modules, namely a first module 22 as well as a second module 23. The second module 23 may for example be formed as a feed-forward controller, which provides a corresponding first steering angle α1 depending on the target trajectory T supplied to this second module 23. The first module 22 may be formed as an adaptive tracking module, which provides a corresponding correction steering angle $\alpha 2$ depending on the detected deviation $\Delta$ between actual and target based on the detected movement parameters 21, which together with the steering angle $\alpha 1$ provided by the second module 23 finally provides the manipulated value for the steering as the overall steering angle $\alpha$.

How fast deviations $\Delta$ between actual and target are corrected therein, is again determined by the control parameters R1, R2, Rn, here especially for the adaptive tracking module 22 for the lateral control. Now, these control parameters R1, R2, Rn may again be adapted depending on the free area value W ascertained as described to FIG. 1. Alternatively or additionally, however, the deviations $\Delta$ themselves may also scale by a scaling parameter adjusted depending on the free area value W. Hereby too, the control strategy and thereby the drive dynamics may be changed adapted to situation.

In this manner, it may also be correspondingly proceeded for each further control module of the control device 18, for example for braking and accelerating operations.

A cascaded control or cascade control may for example also represent an alternative to the two degrees of freedom structure of the control with pre-control and follow-up control described here, which may be implemented by corresponding formation of the control device 18.

Overall, the example shows, how information exchange between environment and control device is allowed by the invention, and thus optimum adaptation to situation, which augments the comfort in automatically driving and at the same time increases the safety.

LIST OF REFERENCE NUMERALS

10 motor vehicle
11 driver assistance system
12 drive dynamics control system
13 environmental sensors
14 evaluation device
15 environmental module
16 path planning device
17 map
18 control device
18*a* lateral controller
19*a*, 19*b*, 19*n* manipulated variable
20 actuators
21 movement parameters
22 first module
23 second module
$\alpha$ overall steering angle
$\alpha 1$ first steering angle
$\alpha 2$ correction steering angle
$\Delta$ deviation
R1, R2, Rn control parameters
T target trajectory
U environment
W free area value The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfill the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A driver assistance system for an at least partially automatically driving motor vehicle, wherein the driver assistance system comprises:
   at least one environmental sensor, which is configured to detect at least one area of an environment of the motor vehicle;
   a processor, which is configured to determine a target trajectory to be traveled by the motor vehicle depending on the detected at least one area of the environment; and
   a drive dynamics control system with a control device, which is configured to adjust an actual trajectory of the motor vehicle to the target trajectory determined by the processor;
   wherein the processor is configured to determine at least one free area value, which at least one free value indicates at least a criticality of a current driving situation depending on the detected at least one area of the environment and to transfer it to the control device;
   wherein the control device is configured to adjust at least one parameter influencing a vehicle control depending on the transferred free area value and to adjust the actual trajectory to the target trajectory according to the adjusted at least one control parameter;
   wherein the at least one parameter influencing the control determines at least how fast a deviation of the actual trajectory of the motor vehicle from the target trajectory is corrected, so that in a critical driving situation, as represented by the at least one free area value, the deviation of the actual trajectory from the target trajectory is corrected fast, while in an uncritical situation, the deviation of the actual trajectory from the target trajectory is corrected slowly.

2. The driver assistance system of claim 1, wherein the control device comprises at least one adjustable control parameter and the control device is configured to adjust the at least one adjustable control parameter as the at least one parameter influencing the control.

3. The driver assistance system of claim 2, wherein the at least one parameter influencing the control represents a scaling parameter for scaling a control deviation.

4. The driver assistance system of claim 2, wherein the at least one parameter influencing the control determines the manner how the actual trajectory is adjusted to the target trajectory.

5. The driver assistance system of claim 2, wherein the control device is configured to ascertain a manipulated value for a manipulated variable to be adjusted on at least one actuator depending on the target trajectory and depending on the transferred free area value and to control the at least one actuator for adjusting the manipulated value.

6. The driver assistance system of claim 2, wherein the control device is configured to ascertain a manipulated value for a manipulated variable to be adjusted on at least one actuator depending on the target trajectory and depending on the transferred free area value and to control the at least one actuator for adjusting the manipulated value.

7. The driver assistance system of claim 1, wherein the at least one parameter influencing the control represents a scaling parameter for scaling a control deviation.

8. The driver assistance system of claim 7, wherein the at least one parameter influencing the control determines the manner how the actual trajectory is adjusted to the target trajectory.

9. The driver assistance system of claim 1, wherein the at least one parameter influencing the control determines the manner how the actual trajectory is adjusted to the target trajectory.

10. The driver assistance system of claim 1, wherein the control device is configured to ascertain a manipulated value for a manipulated variable to be adjusted on at least one actuator depending on the target trajectory and depending on the transferred free area value and to control the at least one actuator for adjusting the manipulated value.

11. The driver assistance system of claim 1, wherein the processor is configured to evaluate a driving situation according to at least one criterion with respect to a criticality depending on the detected at least one area of the environment in case of a deviation of the trajectory traveled by the motor vehicle from the target trajectory and to determine the at least one free area value depending on the evaluation.

12. The driver assistance system of claim 1, wherein the processor is configured to evaluate the driving situation as critical or as uncritical and to determine the free area value from only two predetermined values different from each other depending on the evaluation such that the free area value assumes a first value of the two values in a driving situation evaluated as uncritical and the free area value assumes a second one of the two values in a driving situation evaluated as critical.

13. The driver assistance system of claim 1, wherein the processor is configured to determine the free area value as one of numerous different values from a predetermined interval of values with a first and a second interval boundary, wherein the processor is configured to determine the free area value such that the free area value is selected the closer to the first interval boundary, the more uncritical the driving situation was evaluated according to the at least one criterion.

14. The driver assistance system of claim 1, wherein the processor is configured to ascertain the criticality depending on at least one of the following environmental parameters, which is ascertained based on the detected at least one area of the environment:
   a presence of at least one predetermined object in an environment of the motor vehicle;
   a distance to the at least one predetermined object in the environment of the motor vehicle;
   a number of predetermined objects present in the environment of the motor vehicle;
   a type of an object detected in the environment of the motor vehicle.

15. A motor vehicle with a driver assistance system, comprising:
   at least one environmental sensor, which is configured to detect at least one area of an environment of the motor vehicle;
   a processor, which is configured to determine a target trajectory to be traveled by the motor vehicle depending on the detected at least one area of the environment; and
   a drive dynamics control system with a control device, which is configured to adjust an actual trajectory of the motor vehicle to the target trajectory determined by the processor;
      wherein the processor is configured to determine at least one free area value, which at least one free value indicates at least a criticality of a current driving situation depending on the detected at least one area of the environment and to transfer it to the control device;
      wherein the control device is configured to adjust at least one parameter influencing a vehicle control depending on the transferred free area value and to adjust the actual trajectory to the target trajectory according to the adjusted at least one control parameter;
      wherein the at least one parameter influencing the control determines at least how fast a deviation of the actual trajectory of the motor vehicle from the target trajectory is corrected, so that in a critical driving situation, as represented by the at least one free area value, the deviation of the actual trajectory from the target trajectory is corrected fast, while in an uncritical situation, the deviation of the actual trajectory from the target trajectory is corrected slowly.

16. A method for controlling drive dynamics of an at least partially automatically driving motor vehicle, comprising:
   detecting at least one area of an environment of the motor vehicle;
   determining a target trajectory to be traveled by the motor vehicle depending on the detected at least one area of the environment; and
   adjusting an actual trajectory to the determined target trajectory by a control device;
   determining at least one free area value, which at least one free value indicates at least a criticality of a current driving situation depending on the detected at least one area of the environment transferring the at least one free area value to the control device;
   adjusting at least one parameter of the control device influencing the control depending on the transferred free area value and adjusting, by the control device, the actual trajectory to the target trajectory according to the adjusted at least one parameter influencing the control;
   wherein the at least one parameter influencing the control determines at least how fast a deviation of the actual trajectory of the motor vehicle from the target trajectory is corrected, so that in a critical driving situation, as represented by the at least one free area value, the deviation of the actual trajectory from the target trajectory is corrected fast, while in an uncritical situation, the deviation of the actual trajectory from the target trajectory is corrected slowly.

* * * * *